United States Patent [19]

Lindblom et al.

[11] Patent Number: 5,423,640
[45] Date of Patent: Jun. 13, 1995

[54] DRILL

[75] Inventors: Stefan Lindblom, Gavle; Gustav Sjodin, Sandviken, both of Sweden

[73] Assignee: Sandvik AB, Sandviken, Sweden

[21] Appl. No.: 123,096

[22] Filed: Sep. 20, 1993

[30] Foreign Application Priority Data

Sep. 24, 1992 [SE] Sweden .................. 9202757

[51] Int. Cl.⁶ ............................................. B23B 51/02
[52] U.S. Cl. ..................................... 408/230; 408/227
[58] Field of Search ............... 408/227, 230, 715, 144, 408/145, 229

[56] References Cited

U.S. PATENT DOCUMENTS

| 3,387,511 | 6/1968 | Ackart, Sr. et al. |         |
|-----------|--------|--------------------|---------|
| 4,116,580 | 9/1978 | Hall et al.        | 408/230 |
| 4,222,690 | 9/1980 | Hosoi              | 408/144 |
| 4,983,079 | 1/1991 | Imanaga et al.     | 408/230 |
| 5,088,863 | 2/1992 | Imanaga et al.     | 408/230 |

FOREIGN PATENT DOCUMENTS

| 1190274   | 10/1959 | France .          |         |
|-----------|---------|-------------------|---------|
| 3726251   | 2/1989  | Germany .         |         |
| 0056809   | 4/1985  | Japan             | 408/227 |
| 63-318207 | 6/1987  | Japan .           |         |
| 1-5708    | 1/1989  | Japan .           |         |
| 440324    | 7/1985  | Sweden .          |         |
| 2233920   | 1/1991  | United Kingdom .  |         |

Primary Examiner—Steven C. Bishop
Attorney, Agent, or Firm—Burns, Doane, Swecker & Mathis

[57] ABSTRACT

The present invention relates to a drill comprising a shaft with chip-conveying flutes and a drill head with two or more cutting elements. Each of the cutting elements comprises a cutting edge which is delimited between a chip-breaking surface and a relief surface and which, at least in the proximity of the geometrical center or rotational axis of the drill, comprises a curved portion. The cutting edge of the individual cutting elements is located with its curved portion in such a way that a tangential point on a straight line that extends from the central axis and tangentially touches said curved edge portion, is provided distantly from the central axis of the drill. In the immediate proximity of this central axis, the cutting edge is terminated in a small material portion which is common for all cutting edges and which extends between the cutting elements in order to serve for centering the drill.

14 Claims, 4 Drawing Sheets

DRILL

BACKGROUND AND SUMMARY OF THE PRESENT INVENTION

The present invention relates to a drill comprising a shaft with chip-conveying flutes and a drill head at the front of the shaft, with two or more cutting elements. The cutting elements comprise at least one cutting edge which is delimited between a chip breaking surface and a relief surface and which, at least in the vicinity of the geometric center or rotational axis of the drill, comprises a curved section.

A drill of this type is previously known from SE-B-440 324 (and SE-A-7812393-2). This known drill has good cutting ability and enables drilling with fast feed. However, in practice it is marred by the disadvantage of an inferior centering ability. In relation with a reference plane that cuts the central rotational axis of the drill at an acute angle of 60° to 70° to a main plane that is parallel with the straight main sections of the cutting edges (or about centrally in the sectors being defined by the ends of the chip-conveying flutes), the curved section of each cutting edge protrudes a bit past this reference plane, at the same time as the relief surface of each cutting element, which relief surface is situated behind the cutting edge in the direction of rotation, extends as an uninterrupted surface up to the curved section of the cutting edge. Moreover, it is preferred that the curved section starts to curve in the immediate proximity of the central axis of the drill. This geometry produces two cutting edges that form a chisel-like configuration with a pronounced longitudinal extension in the area where the edges converge. When this chisel configuration is put against a work piece for drilling and entering into the same, it tends to slide transversely upon the surface of the workpiece.

In practice, the entering surface of the workpiece is rarely perfectly plane and rarely oriented absolutely perpendicularly to the rotational axis of the drill. On the contrary, the entering surface is often rough or uneven and can be inclined locally or entirely one or more degrees in relation to the drill axis. Also with a very forcible placing of the drill against the workpiece, the chisel configuration of the drill tends to move at least a little transversely, without any capacity of finding a distinct centration. This tendency is particularly pronounced just at the entering of the workpiece, but the generally bad centering ability is also present when the drill head has worked its way into the workpiece, causing vibrations in the workpiece and in the drill itself. These inconveniences also become noticeable when working with relatively long drills (drills whose length is equal to or exceeds 3.5 times the diameter of the drill), particularly in connection with crank fixations of the workpiece. When vibrations arise, these negatively influence the quality of the drilled hole and the durability of the drill.

One object of the present invention is to eliminate the above mentioned inconveniences of previously known drills and create a drill with good centering ability. Thus, a primary object of the present invention is to confer to the head of the drill such a geometry that it becomes self-centering at the placing against and the initial penetration of the drill into a workpiece. The drill also maintains a good centering ability during the continuing penetration of the workpiece, whereby the good centering ability shall be possible to achieve without the necessity of large feeding or placing forces. Another object of the present invention is to attain a good centering ability without the necessity of substantially reducing the active cutting edge length.

According to the present invention, at least the primary object is brought about by the drill as set forth in claim 1. Further preferred embodiments of the present invention are defined in the dependent claims.

BRIEF DESCRIPTION OF THE DRAWINGS

The present invention will be described with reference to the accompanying drawings, wherein like members bear like reference numerals, and wherein.

DETAILED DESCRIPTION OF THE PREFERRED EMBODIMENT

Figure 1:
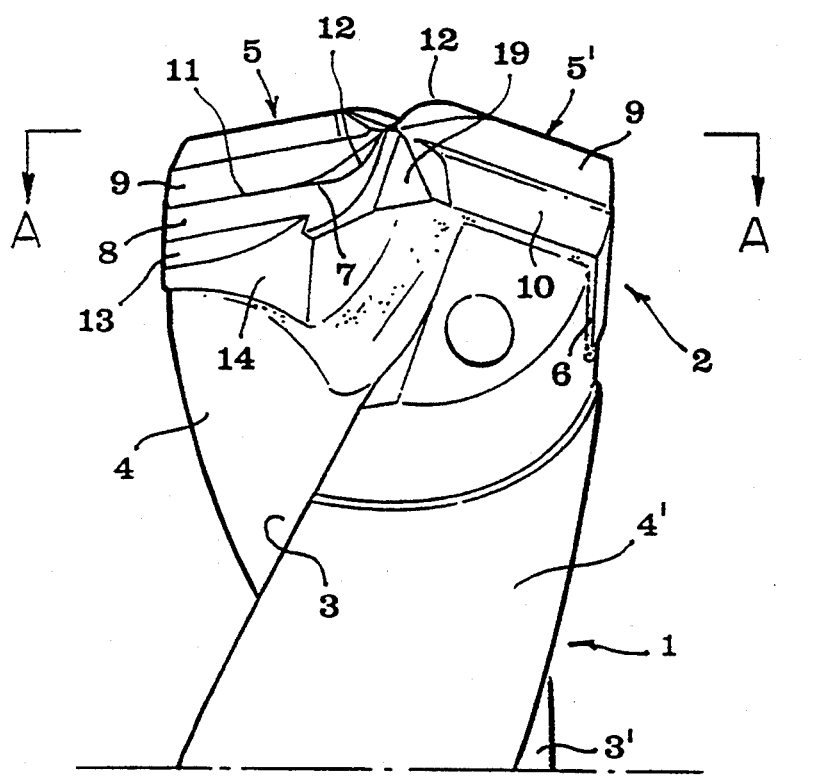
FIG. 1 is a perspective view of the front or free end of a drill according to the present invention.
Figure 2:
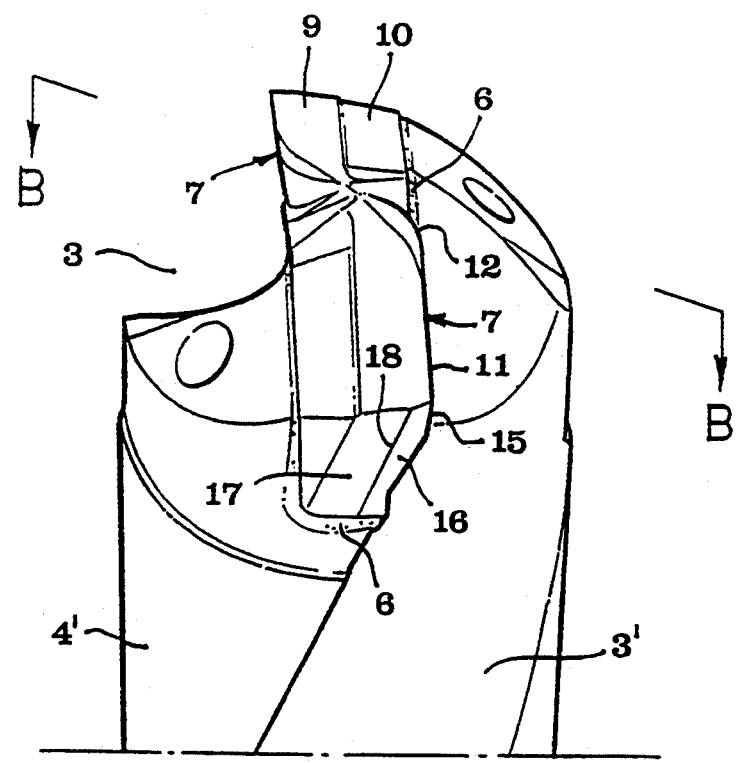
FIG. 2 is a similar perspective view which has been turned about 90° in relation to the view of FIG. 1.

The drill shown in FIGS. 1 and 2 comprises a shaft 1 and a drill head designated in its entirety by 2. Two helical or screw-formed flutes 3,3' are formed in the shaft 1, which flutes are delimited by analogous, helically formed protruding lands 4,4'. The drill head 2 comprises two, in the present case identical, but inverted cutting elements 5,5' which extend in each other's extension in a common main plane A—A that cuts the central or rotational axis of the drill (in FIG. 3 this axis is designated by a C). In FIG. 2, a reference plane B—B also extends through the central axis of the drill. However, the reference plane B—B extends at an acute angle in relation to the main plane A—A, more specifically at an angle of about 68°. In this embodiment, the cutting elements 5,5' are made as parts of a common cutting body, e.g., of cemented carbide, which has been secured upon the shaft by a soldered or brazed joint 6 and thereafter ground to its final shape, as shown in the drawings. Although this embodiment is preferred in practice, it is within the scope of the present invention to form the two cutting elements 5,5' of the drill head as an integral part of the drill shaft 1 as such, i.e., as ground parts of the drill shaft.

Each individual cutting element 5,5' comprises a cutting edge designated in its entirety by 7, which is generally delimited between, on the one hand, a chip-breaking surface 8 and on the other hand, a relief surface 9. In relation with the total width of the cutting element, the relief surface 9 has a reduced width by the fact that the piece of which the cutting head has been produced, has a countersunk surface 10 in the area behind the relief surface, seen in the direction of rotation of the drill. By the reduction of the width of the surface 9 to about one-half of the total width of the cutting head, the necessary grinding of the relief surface is simplified and speeded up.

Each individual cutting edge 7 comprises a main section 11 which in the present case is substantially straight and which extends from the periphery of the drill head and which continues into a curved section 12 closer to the central axis of the drill. The chip surface 8 is also formed with a restricted width in order to simplify grinding of the same. For this reason, a recess is formed in the blank of the drill head, in the area below the peripheral part of the chip surface. This recess is delimited on the one hand by an inclined plane surface 13 and on the other hand by a vaulted surface 14. At its peripheral end, the cutting edge 7 continues into an edge section 15 that is substantially axial, behind which section there is a flange surface 16 which has a restricted width by the fact that the end surface of the drill head has been formed with at least one countersunk surface 17 in the area behind a delimiting line 18. By the existence of this axial edge section, it is possible to grind the cutting elements without changing the effective diameter of the drill head.

With reference to FIGS. 1 and 2, it should be noted that each individual chip-conveying flute 3 ends in a restricted space (19 in FIG. 1) in the area between the cutting elements 5,5'. More specifically, this restricted space 19 is situated between on the one hand the curved cutting edge section 12 of the one cutting element, and on the other hand the inner end of the countersunk relief surface 10 of the other cutting element. This is true for both sides of the central main plane A—A.

FIGS. 1 and 2 provide a general overview of the configuration of the drill according to the present invention. Reference is now made to FIGS. 3 to 10, which give a more detailed explanation of the geometric form of the drill.

Figure 3:
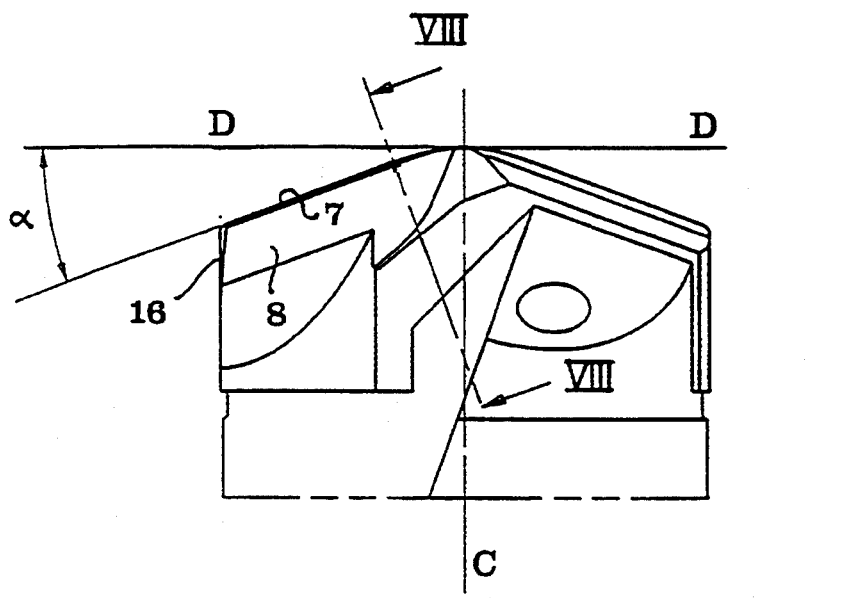
FIG. 3 is a side view of the free end or head of the drill.

In FIG. 3, D—D is an imaginary plane extending through the tip of the drill, perpendicularly to the central axis C. The angle $\alpha$ between this transversal plane D—D and the straight cutting edge 11 according to the shown embodiment amounts to around 20°, which means that the tip main angle of the drill amounts to about 140°. This is a conventional tip angle which can vary upwards and downwards. In this connection it should also be mentioned that the flange surface 16 is somewhat inclined in relation to the central axis C. More specifically, the central axis may be inclined in such a way that the rear section of the surface is situated somewhat nearer to the axis C than the fore section (not visible on the drawings), thus conferring a certain clearance to the surface. In practice, this clearance or relief angle (not shown) can be extremely small.

Figure 4:
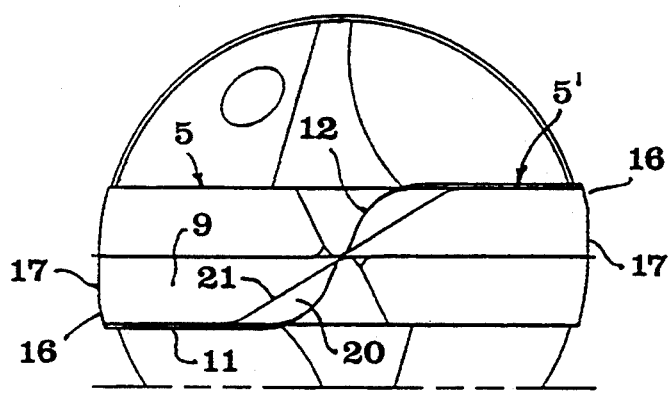
FIG. 4 is a partially cut end view of the drill head according to FIG. 3.
Figure 5:
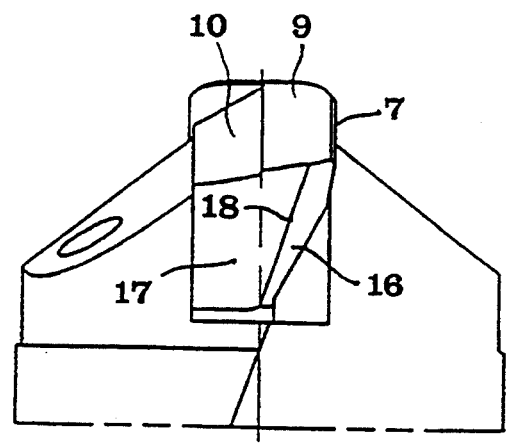
FIG. 5 is a second side view of the same drill head, which has been turned 90° in relation to the view according to FIG. 3.

With reference to FIG. 4, the primary relief surface 9 of each cutting element 5,5' comprises a secondary, ground relief surface 20 in the area of the curved cutting edge section 12, which surface is delimited by a break or delimiting line 21 which in the present case is substantially straight.

Figure 6:
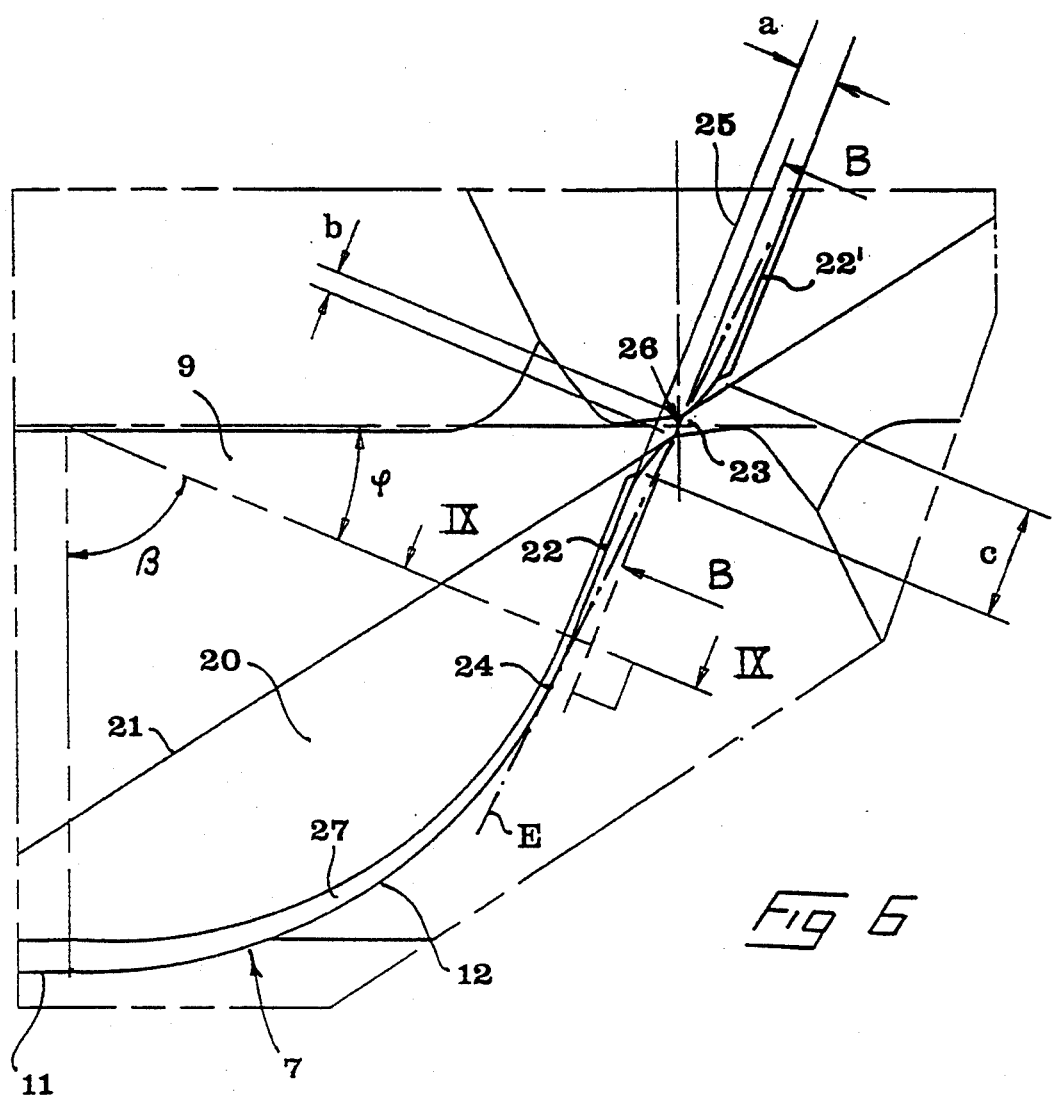
FIG. 6 is an enlarged view of a central section of the tip of the drill head, seen as an end view in the same way as in FIG. 4.
Figure 7:
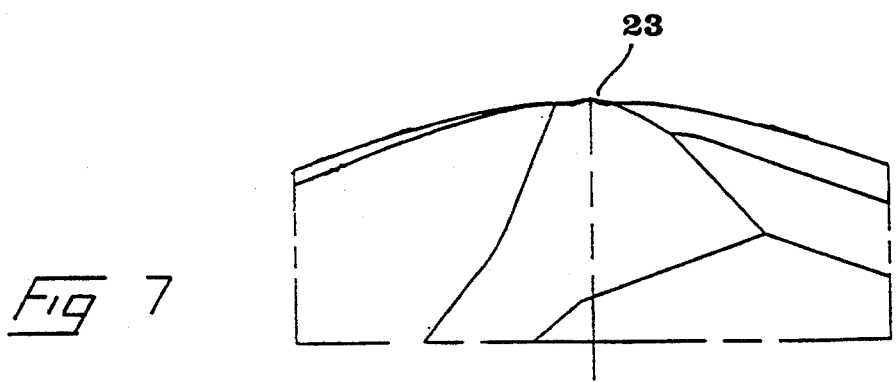
FIG. 7 is an enlarged view of a central tip section of the drill head, seen in the same way as in FIG. 3.
Figure 8:
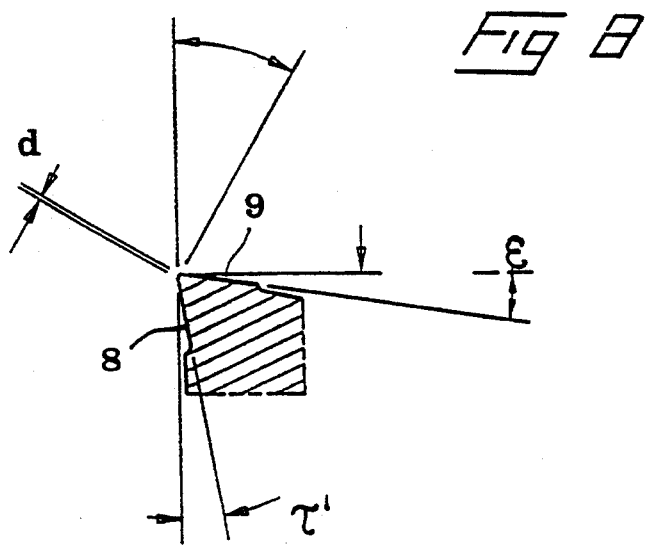
FIG. 8 is a partial cross-sectional view along line VIII—VIII in FIG. 3.
Figure 9:
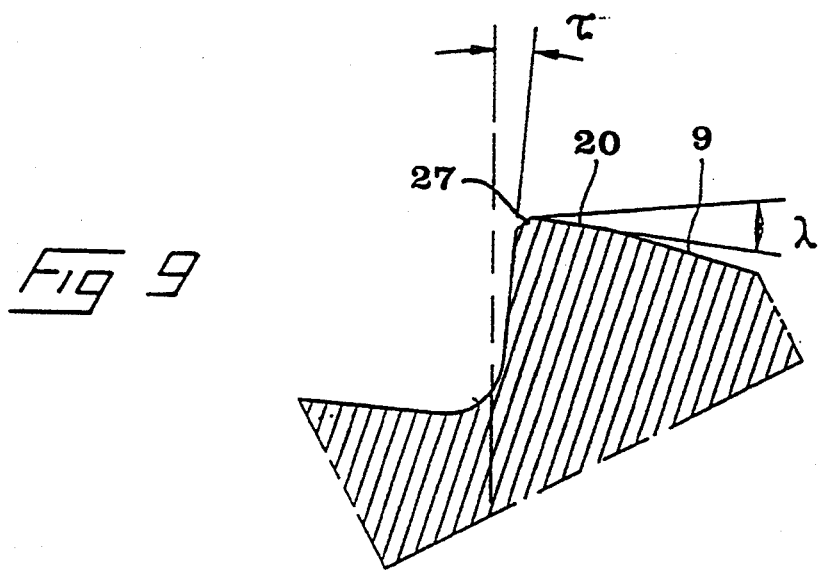
FIG. 9 is the cross-sectional view along the line IX—IX in FIG. 6.

With reference to FIG. 6, the general tip geometry of the present invention is illustrated. This figure shows the tip portion of the drill head amplified 8 times in comparison with FIG. 4 and illustrates how the curved section 12 of the cutting edge 7 extends along the curved line of a circle sector from the straight main section 11. The circle sector has the circle angle $\beta$ which in the shown embodiment is about 68° (the complementary angle $\psi$ is thus about 22°). Further according to the illustrated embodiment, the curved cutting edge section 12 continues into a second, straight cutting edge section 22 in the proximity of the drill central axis C. The reference plane B—B which was mentioned in connection with FIG. 2, extends according to the shown example obliquely towards the main plane A—A, more specifically at an angle that corresponds with the sector angle $\beta$, i.e., about 68°. In a way that is characteristic for the present invention, the cutting edges 7,7' of the two cutting elements are so formed near to the center of the drill, that the inner, straight cutting edge sections 22,22' are distanced outwardly from the reference plane B (or backwardly from said plane when seen in the direction of rotation of the drill), whereby the cutting edges in the immediate proximity of the central axis of the drill are terminated in a common, diminutive material part 23 that extends between the two cutting elements 5,5' in order to serve as a drill-centering center punch. Hence, each curved cutting edge section 12 is so located that a tangential point 24 on an imaginary straight line E (shown as a dashed-dotted line in FIG. 6), which line E cuts the central axis C of the drill, is commonly touched by the curved cutting edge sections 22,22' of the two cutting elements. That tangential point is distanced from the central axis C of the drill.

It can be seen in FIG. 6 that the straight cutting edge section 22 next to the drill's central axis extends substantially parallel to the reference plane B—B, whereby an imaginary extension line 25 to the cutting edge section 22 on the cutting element 5 extends parallel to the analogous straight cutting edge section 22' on the other cutting element 5' and is located at a certain distance a from the latter. In the illustrated embodiment, the distance a amounts to about 0.3 mm, although smaller and larger values are also feasible. However, in practice, the distance a should be between 0.05 and 0.50 min.

The central punching section 23 comprises a break line 26 in the absolute center of the drill. The break line is formed at the grinding of the relief surfaces 9 of the respective cutting element. The measure b of the break or edge line 26 should be smaller than the gap a and amounts to about 0.1 min. Although this width measure of the center punch section may vary, it should be within the range of 0.05 to 0.25 mm. The measure c, which marks the distance between the points at which the straight cutting edge sections 22,22' transpose into the center punch section 23, can be 5 to 10 times larger than the measure b. It should also be mentioned that the measure a preferably is 2 to 4 times larger than measure b.

Although material section 23 thus has relatively small dimensions, it nevertheless forms a distinct center punch that hits the surface of the workpiece first and gets a hold in it. In practice, the relief angle $\epsilon$ of the surface 9 (see FIG. 8) amounts to about 8°. Therefore, if the surface 9 were to be formed as an uninterrupted plane surface from its peripheral end to the curved cutting edge section 12 at the opposite, inner end, the curved cutting edge section could be located on the same level as the center punch 23, seen in the feeding direction of the drill. Particularly, the outer part of the curved cutting edge section, i.e., the section that is distanced from the main plane A—A could be arranged at the same level as the center punch.

Figure 10:
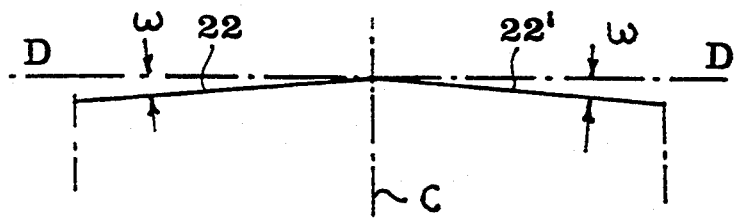
FIG. 10 is a schematic view as seen in a reference plane B—B of FIG. 6.

In order to avoid this, the previously mentioned, secondary relief surface 20 is ground into the surface 9 adjacent to the curved cutting edge section 12. As can be further seen from the cross-section in FIG. 9, which is enlarged in comparison with FIG. 8, the secondary relief surface 20 forms an angle λ with the primary relief surface 9 that can amount to about 13°, although smaller and larger angles are also feasible. By grinding the surface 20, the drill head will also have an acute angle in a direction transverse to the main plane A—A. More specifically, each of the two straight, inner cutting edge sections 22,22' will form a certain angle ω with the transversal plane D—D, as can be seen in FIG. 10. In practice, the angle ω can be about 5°, which means that the secondary tip angle in the plane B—B will be about 170°. Of course, the angle ω can be smaller or larger than 5°. However, the thus formed secondary tip angle should be between 160° and 179°, suitable between 165° and 175°.

The cutting edge 7 on each cutting element does not have the form of a completely sharply ground edge line between the chip surface 8 and the relief surface 9. On the contrary, the cutting edge comprises a reinforcing face 27 (see FIGS. 6, 8 and 9) consisting of a special ground surface with an extremely small width in the area between the chip surface and the relief surface. In practice, the width d (see FIG. 8) of this reinforcing face can lie within the range of 0.01 to 0.30 mm, preferably around 0.10 mm. The width of the reinforcing face can vary along the cutting edge. Due to the existence of this reinforcing face, the cutting edge gets a considerably larger strength and longer durability than a sharp-ground cutting edge which is more apt to damages.

In accordance with a preferred embodiment of the present invention, the cutting edge is formed with a varying chip angle along its extension from its peripheral section to its inner end adjacent to the center punch section 23. More specifically, the cutting edge has a negative chip angle in the area of its inner straight section 22 and along the innermost part of its curved section 12. As can be seen from the cross-section IX—IX in FIG. 9, which is cut around the area between the straight section 22 and the curved section 12, the cutting edge in this area has a negative chip angle τ of about 5°. However, in the cross-section VIII—VIII (FIG. 8), which is taken at a larger distance from the center axis of the drill along the curved cutting edge section, the chip angle τ' is positive. However, this positive chip angle τ' should amount to maximally about 10°. Such a chip angle of about 10° can advantageously be formed along the whole extension of the straight main section 11 of each of the cutting edges. Hence, the chip angle is gradually changed from a negative angle in the area next to the center of the drill, to an increasingly more positive chip angle, from a turn point defined at a predetermined location along the curved cutting edge section 12. Since the chip angle thus is negative adjacent to the center of the drill, the cutting edge is extraordinarily strong in the area where it is submitted to the largest strain.

When the described drill is brought into contact with a workpiece, the center punch 23, which is formed as a distinct tip, will first enter into the workpiece, whereafter the two cutting edges, starting with the two inner cutting edge sections 22,22', which are straight and behind the reference plane B—B in the direction of rotation, gradually become active radially outward from the central axis C. This action continues until all the cutting edges are fully engaged with the workpiece. This gradual engagement is considerably simplified by the fact that the drill tip has a tip angle not only in the main plane A—A, but also a certain secondary tip angle in the reference plane B—B, as shown in FIG. 10. In this way, the central pressing zone of the drill is minimized when entering the workpiece, thus reducing the necessary feeding or pressing force. Tests have indicated that the feeding force can be considerably reduced in comparison with the force that has been previously considered necessary. Moreover, the center punch section 23, in combination with the geometry in general, guarantees that the drill is centered in a reliable way, not only at the entering of the workpiece but also during the continued drilling in the same. Also, at relatively difficult fixations of the workpiece, the drill becomes auto centering, hence minimizing any tendency of vibrations. This improves the quality of the drilled hole and increases the durability of the drill quite considerably.

Obviously, the invention is not restricted to the embodiment described above. Thus, it is not absolutely necessary to make section 22 of the cutting edge, which section extends from the tangential point 24 to the central center punch section 23, as an absolutely straight cutting edge section. Within the scope of the invention, this section can also be more or less arch-formed. The only essential point is that the cutting edge section in question be located in the area behind the reference plane B—B. Further, although the described embodiment comprises a drill head in the form of a cemented carbide body that is fixedly joined with the shaft by a soldered or brazed joint, the invention also foresees detachable cutting bodies, for instance, by being provided with a central tap which can be introduced into a central seat at the end of the shaft and can be fixed thereto by one or several screws which can be tightened from the side of the shaft. Further, it should be noted that the cutting element can be formed with a broken or divided cutting edge, although the embodiment shown in the drawings comprises a continuous cutting edge on each cutting element 5,5'. Thus, the individual cutting element can have its main part 11 or parts of it countersunk in relation with the cutting edge in general, i.e., retracted a bit rearwardly in axial direction from a cutting edge section including the curved section 12. Further, it is understood that the invention is not restricted to drills comprising precisely two cutting elements. Thus, the invention can also be applied to drills with several cutting elements, i.e., with three or four cutting elements.

The principles, preferred embodiment and mode of operation have been described in the foregoing specification. However, variations and changes may be made that fall within the scope of the appended claims.

What is claimed is:

1. A drill comprising a shaft having a center axis, chip conveying flutes and a drill head with at least two cutting elements, each cutting element being provided with at least one cutting edge which is delimited between a chip-breaking surface and a first relief surface of each cutting element, each cutting element having, at least in the proximity of the center axis of the shaft, a curved cutting edge section, the cutting edge of the individual cutting element being located with its curved cutting edge section such that a tangential point on a straight line that extends from said center axis tangentially touches said curved section distantly from the center of rotation, a portion of each cutting edge located adjacent to said center axis being terminated with a small material portion that is common for all cutting edges, the small material portion between the cutting elements being provided to center the drill, the curved cutting edge section of each of the cutting edges continuing into a substantially straight portion from a point adjacent its tangential point on said tangential line, the straight portion extending toward the center portion of the drill, a straight extension line of the straight portion of the cutting edge of one cutting element being substantially parallel with a corresponding straight portion of the cutting edge of the other cutting element, said straight portions of the cutting elements being separate from one another.

2. The drill according to claim 1, wherein the distance between the straight portion of one cutting edge and the extension line of the corresponding straight portion of the other cutting edge is larger than a width of the small material portion.

3. The drill according to claim 2, wherein the distance between the straight portion of one cutting edge and the straight portion of the other cutting edge is two to four times larger than the width of the small material portion.

4. The drill according to claim 1, further comprising a secondary relief surface ground into the first relief surface of the cutting element, said secondary relief surface being adjacent to the curved cutting edge section of the cutting element, said secondary relief surface ensuring a secondary acute angle in a reference plane in immediate proximity of said tangential line.

5. A drill comprising a shaft having a center axis, chip conveying flutes and a drill head with at least two cutting elements, each cutting element being provided with at least one cutting edge which is delimited between a chip-breaking surface and a first relief surface of each cutting element, each cutting element having, at least in the proximity of the center axis of the shaft, a curved cutting edge section, the cutting edge of the individual cutting element being located with its curved cutting edge section such that a tangential point on a straight line that extends from said center axis tangentially touches said curved section distantly from the center of rotation, a portion of each cutting edge located adjacent to said center axis being terminated with a small material portion that is common for all cutting edges, the small material portion between the cutting elements being provided to center the drill, a secondary relief surface ground into the first relief surface of the cutting element, said secondary relief surface being adjacent to the curved cutting edge section of the cutting element, said secondary relief surface ensuring a secondary acute angle in a reference plane in immediate proximity of said tangential line.

6. The drill according to claim 5, wherein the width of the small material portion is 0.05 to 0.25 mm.

7. The drill according to claim 5, wherein said secondary acute angle lies within the range of 160° to 179°.

8. The drill according to claim 5, wherein the secondary relief surface is delimited by a break line which extends from a point situated between the center punch section and said tangential point to a point along the preferably straight main portion of the cutting edge.

9. The drill according to claim 5, wherein the width of the small material portion is approximately 0.10.

10. The drill according to claim 8, wherein the break line is arranged in the center of the small material portion.

11. The drill according to claim 5, wherein the secondary acute angle lies within the range of 165° to 175°.

12. The drill according to claim 5, wherein the small material portion forms a center punch section.

13. A drill comprising a shaft having a center axis, chip conveying flutes and a drill head with at least two cutting elements, each cutting element being provided with at least one cutting edge which is delimited between a chip-breaking surface and a first relief surface of each cutting element, each cutting element having, at least in the proximity of the center axis of the shaft, a curved cutting edge section, the cutting edge of the individual cutting element being located with its curved cutting edge section such that a tangential point on a straight line that extends from said center axis tangentially touches said curved ,section distantly from the center of rotation, a portion of each cutting edge located adjacent to said center axis being terminated with a small material portion that is common for all cutting edges, the small material portion between the cutting elements being provided to center the drill, an angle of the chip-breaking surface being negative in the area of the curved cutting edge section that is located adjacent the center axis of the drill, and the angle gradually changing to a positive angle closer to a periphery of the drill.

14. The drill according to claim 13, further comprising a secondary relief surface ground into the first relief surface of the cutting element, said secondary relief surface being adjacent to the curved cutting edge section of the cutting element, said secondary relief surface ensuring a secondary acute angle in a reference plane in immediate proximity of said tangential line.

* * * * *